US011675783B2

(12) United States Patent
Meling et al.

(10) Patent No.: US 11,675,783 B2
(45) Date of Patent: Jun. 13, 2023

(54) USING A SEARCH TO DETERMINE WHAT A GROUP OF PEOPLE ARE WORKING ON

(71) Applicant: Microsoft Technology Licensing, LLC, Redmond, WA (US)

(72) Inventors: Jon Meling, Tromsø (NO); Torbjørn Helvik, Olso (NO); Vegar S Wang, Tromsø (NO); Jakob Werner, Oslo (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 198 days.

(21) Appl. No.: 16/917,522

(22) Filed: Jun. 30, 2020

(65) Prior Publication Data

US 2021/0406256 A1    Dec. 30, 2021

(51) Int. Cl.
*G06F 16/248* (2019.01)
*G06F 16/245* (2019.01)
*G06F 16/25* (2019.01)
*G06F 3/0482* (2013.01)

(52) U.S. Cl.
CPC .......... *G06F 16/245* (2019.01); *G06F 3/0482* (2013.01); *G06F 16/248* (2019.01); *G06F 16/252* (2019.01)

(58) Field of Classification Search
CPC .... G06F 16/245; G06F 3/0482; G06F 16/248; G06F 16/252; G06F 16/33
See application file for complete search history.

(56) References Cited

U.S. PATENT DOCUMENTS

| | | | |
|---|---|---|---|
| 8,204,888 B2 | 6/2012 | Frieden et al. | |
| 8,510,322 B2 | 8/2013 | Ray et al. | |
| 8,577,862 B2 | 11/2013 | Petschulat et al. | |
| 8,959,109 B2 | 2/2015 | Sgro et al. | |
| 2013/0268532 A1* | 10/2013 | Doshi | G06F 16/285 707/737 |
| 2016/0203237 A1* | 7/2016 | Whitnah | G06F 16/951 707/722 |
| 2016/0306798 A1 | 10/2016 | Guo et al. | |
| 2017/0235841 A1 | 8/2017 | Li et al. | |
| 2019/0108274 A1* | 4/2019 | Daboll-Lavoie | G06F 16/3338 |

OTHER PUBLICATIONS

"International Search Report and Written Opinion issued in PCT Application No. PCT/US21/028731", dated Jul. 23, 2021, 11 Pages.
Hawking, et al., "An enterprise search paradigm based on extended queryauto-completion. Do we still need search and navigation?", In Proceedings of the 18th Australasian Document Computing Symposium, Dec. 5, 2013, pp. 18-21.
Serdyukov, et al., "Automatic people tagging for expertise profiling in the enterprise", In Proceedings of European Conference on Information Retrieval, Apr. 18, 2011, 12 Pages.

* cited by examiner

*Primary Examiner* — Phuong H Nguyen

(57) ABSTRACT

Examples of the present disclosure describe systems and methods for determining relationships between content items to create a visualization associated with the various content items. The visualization may provide information regarding what various individuals in a group, team, or organization have been working on (e.g., content, documents, projects).

20 Claims, 10 Drawing Sheets

USING A SEARCH TO DETERMINE WHAT A GROUP OF PEOPLE ARE WORKING ON

BACKGROUND

In many organizations and groups, especially large organizations and groups, it is common for members to work on various projects with a number of different individuals. Over time, the structure of the organizations or groups may change as members are added or removed. Additionally, it may be difficult to track or otherwise identify content items or other information that is produced by, or is otherwise associated with, the various members of the organizations or groups.

SUMMARY

Examples of the present disclosure describe systems and methods for using a search to determine what members of a team, a group or an organization are working on and subsequently displaying that information in a user interface of a computing device. Although a team, group and organization are specifically mentioned, the present application is not limited to such formal association. Rather, the individuals may be an ad hoc group or have some other determined association.

In some examples, the association may be formal in nature. For example, a particular individual may supervise a group of individuals on a particular project. Although the particular individual may not be the author of content associated with the project, the particular individual may be responsible for reviewing documents, editing comments, providing feedback and so on. As the particular individual interacts with other group members (e.g., via electronic messages, meetings, telephone calls) and/or with content provided by group members (e.g., editing content, authoring content, collaborating on content, reading content, citing content in other documents), relationships between the various group members and various content items may be stored and subsequently detected.

In subsequent search queries that specify a particular search term (e.g., a particular individual or topic), these relationships may be used to surface various results that provide information regarding what the particular individual is working on, who the particular individual is working with and any content items relating to the particular individual and/or group members. In some examples, the results of the search query may be organized and provided in a visualization.

A received search term may also be used to generate a suggested query to identify what various individuals of a group are working on. The suggested query may be presented to the individual that provided the search term or it may be executed automatically. For example, if "artificial intelligence" is provided as a search term, the system may execute a query to identify content items or entities that are related to artificial intelligence. The system may also formulate a suggested search query and provide the suggested search query to the individual. The suggested search query may be based on one or more known or determined relationships between the search term, the individual that submitted the search term and/or members of a group.

Accordingly, aspects of the present disclosure describe a system comprising a processor and a memory communicatively coupled to the processor. The memory stores instructions that, when executed by the processor, perform operations. These operations may include detecting a query input in a user interface provided on a display of a computing device and processing the input to identify a term. When the term is identified, the system determines whether a number of first content items to be returned in response to executing a query on a data source using the term is below a threshold. When it is determined the number of first content items to be returned is below the threshold a first relationship between the term and a plurality of data items stored in the data source is identified. The plurality of data items are analyzed to determine a second relationship between respective ones of the plurality of data items and a plurality of second content items. A response to the query input is provided on the display of the computing device. In some examples, the response to the query input includes at least a subset of the plurality of second content items.

The present application also describes a method that includes detecting a query input in a user interface provided on a display of a computing device and processing the input to identify a term. A determination is made as to whether a number of first content items to be returned in response to executing a query on a data source using the term is below a threshold. When it is determined the number of first content items to be returned is below the threshold, a first relationship between the term and a first data item in the data source is identified. The first data item in the data source is analyzed to identify a second relationship between the first data item and a second data item. A response to the query input is then provided on the display of the computing device. In some examples, the response to the query input includes the second data item.

Also described is method that includes receiving input for a search query and processing the input to identify a term. A first relationship between the term and a first data item in the data source is identified and the first data item in the data source is analyzed to identify a second relationship between the first data item and a second data item. A response to the query input is provided on the display of the computing device. In some examples, the response to the query input includes the second data item.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
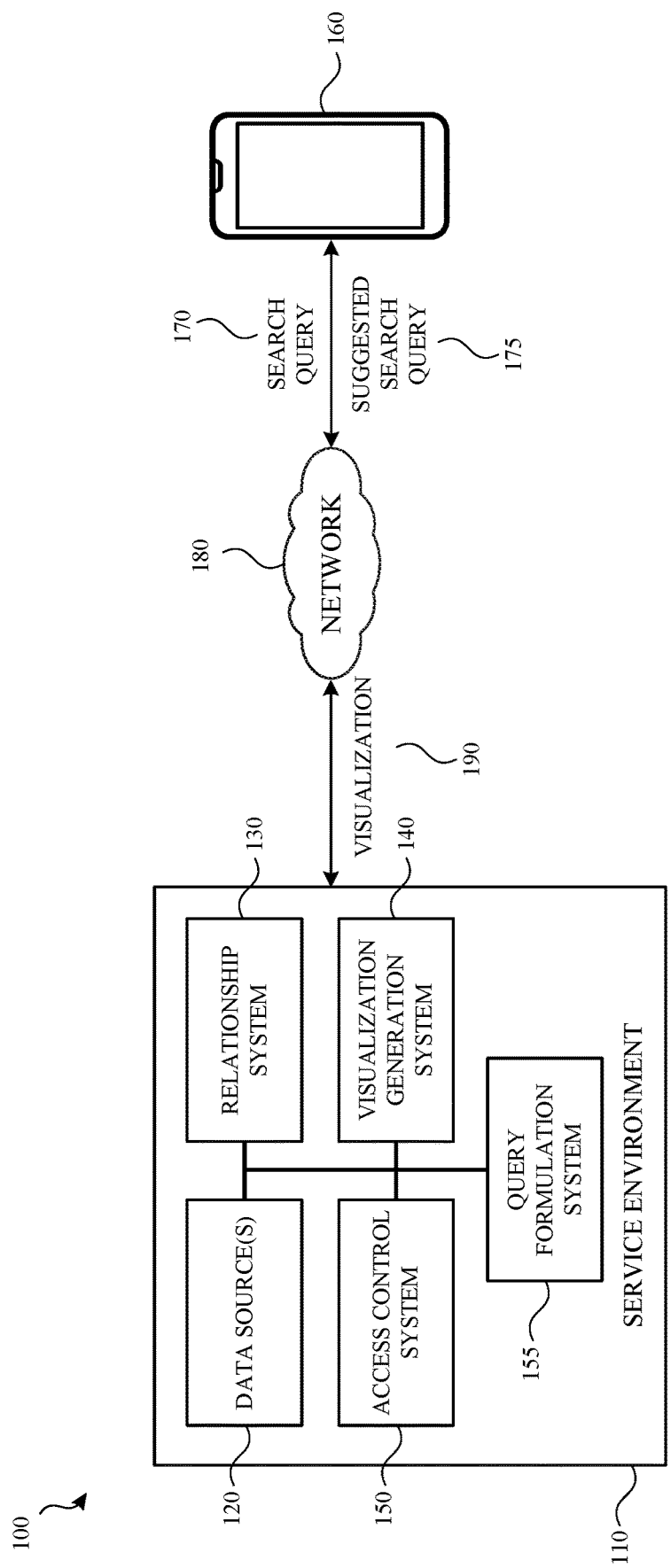
FIG. 1 illustrates an overview of an example system for identifying what individuals in a group are working on according to an example.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

In every organization and group, there are members that have different skills, experience, knowledge sets, and areas of expertise. Although such diversity of knowledge and experience may substantially enrich the efficacy, productivity, and culture of the organization or group as a whole, it may also introduce challenges.

As one example, a particular individual in a group may be responsible for managing a team of individuals. As part of the management responsibilities, the particular individual may review a number of different documents, provide feedback on those documents, attend meetings and so on. However, although the particular individual may contribute a significant amount of information to the final work product, that particular individual might not be identified as an author (or receive other credit/acknowledgement) of those documents. As a result, in current search solutions, searches for documents or work product relating to the particular individual will not accurately reflect information regarding what the particular individual is actually working on and/or projects the particular individual is engaged in.

In another example, it may be difficult to identify content items that various members of a group are producing and/or working on. For example, if a particular group of individuals is working on a particular project, current search systems do not enable a search to be performed on content items that are produced by the various members of that group and/or the group as a whole.

To address the challenges described above, the present application describes the generation of a visualization that shows or otherwise indicates what a particular individual in a group of individuals is working on or is otherwise associated with—even when that individual is not identified as an author (or other contributor) of a particular content item. In some examples, the particular individual may be associated with content items that various other individuals have created. For example, the particular individual may have commented on, collaborated on, and/or reviewed content items created by other individuals. In another aspect, the visualization may be generated based on what a group of individuals are working on or otherwise associated with.

In some examples, the visualization may be generated in response to a specific search term provided in a user interface of a computing device. When a search term is received, the system may execute a search for data items (e.g., content items, entities, subject matter) that are associated with the received search term. For example, an individual may request a search for "Cate Smith". However, Cate Smith, while contributing to a number of different content items, may not have actually authored a lot (or any) content items. As such, the search results that are returned may not be indicative of what Cate Smith is actually working on.

However, using the features described herein, if results (or anticipated results) of a search are below a threshold (e.g., five or fewer, ten or fewer, fifteen or fewer), an option to search for additional data items associated with "Cate Smith" may be provided on the user interface. When the option is selected, the additional search may be performed. In other examples, the search described above may be automatically performed if results (or anticipated results) of a search are below a threshold.

Thus, the present application provides insights into a knowledgebase of various individuals in a team, group or organization. In some examples, the team, group or organization may be arranged in or otherwise be associated with a hierarchical structure (although this is not required). The hierarchical structure may be used to help determine which individuals head a group or organization, which individuals report to whom, and so on.

The present application also describes the generation of a query suggestion that enables an individual to identify content items that individual members of a particular group and/or the group as a whole are working on. Once the content items and/or individuals are identified, the results may be provided in a visualization.

For example, if an individual provides a search term for content items relating to artificial intelligence, the system described herein may execute a search for content items and/or entities relating to artificial intelligence and provide the results in a visualization. In another example, the system may determine, based on known or identified relationships between stored data items, that a particular individual is a team lead on a particular project relating to artificial intelligence. As such, the system may formulate a query suggestion in which all content items produced by individuals that report to (or are otherwise associated with) the particular individual (or a particular team/group) and that relate to artificial intelligence are returned. These results may be provided in the visualization.

In one example, the query suggestion may be provided in a user interface to enable the individual to decide whether the suggested query will be executed. In another example, the suggested query may be automatically executed (e.g., without received input from the individual). In yet another example, the individual may provide a search term that causes the system to execute the query described above. For example, the individual may provide a search term that indicates the individual would like to see content items produced by an individual and/or a group of individuals that report to the particular individual and that are related to artificial intelligence.

In some examples, the visualization that is generated, and the content items provided in or otherwise associated with the visualization, may be identified and/or populated based on determined or defined relationships between particular entities (e.g., individuals, groups, organizations and so on) and/or on determined or defined relationships between various entities and various content items (e.g., documents, electronic messages, audio files, video files, presentations). In another example, the system may identify a relationship between an individual that provided the search term and various other entities and/or content items. These relationships may be based on a detected or determined interaction with a particular content item or items and/or a determined interaction with other individuals.

Example interactions may include, but are not limited to, composing or editing a content item, receiving or sending a content item, navigating to or within a content item or data source, consuming (e.g., viewing or listening to) a content item, requesting a search operation, collaborating on a content item with another individual, or commenting on a content item.

This relationship information may be used to search one or more data sources for relationships between identified information and content items, topics, and/or entities stored by the data sources. Examples of data sources include databases (e.g., relational databases or graph databases), flat files, and the like.

In some examples, the relationships may correspond to explicit linking data and/or implicit linking data. Explicit linking data may include relationships explicitly defined by an individual and/or relationships explicitly referencing a content item. For instance, an individual may be identified as a supervisor for a group of individuals or another individual. In another example, one individual may report to another individual. In yet another example, a particular individual may be affirmatively identified as a co-author or collaborator of a document with another individual. The identification of the individual as a supervisor, report, co-author, collaborator, editor, contributor, reviewer of the document in the data source (by an individual or a process of the data source) may be viewed as an explicit link between the individuals and/or the document(s). In yet another example, a link to a document or other content item associated with a first individual that is inserted or otherwise associated with a second document associated with a second individual may define an explicit link between the first document and second document, the second document and the first individual and/or the first individual and the second individual.

Implicit linking data may include relationships implicitly defined by the data source or an associated application or service. For instance, an artificial intelligence entity or system may analyze content, determine the subject matter of the content and determine, based on additional data (e.g., hierarchical/group information, authorship data, co-authorship data), that a particular individual is associated with that subject matter. Accordingly, the subject matter similarity between the content item and the individual may define an implicit link between the individual and the document. In another example, a portion of content may be copied from a first document to a second document, without an explicit reference back to the first document. As a result, the first document may be implicitly linked to the second document.

In some examples, a search of various data sources executed by the system in response to a received query may identify a first set of search results. The first set of search results identify content items, entities, domains, etc. (collectively referred to herein as "data items"). The first set of search results may be associated with various different data items such as, for example, a particular topic, a particular subject matter, a particular content item, a particular group, and/or a particular entity. Identifying the first set of search results may include comparing one or more terms in the search results to one or more terms or tags associated with various data items in the data sources. In some examples, tags may indicate topics, subject matter and/or concepts included in or relating to a data item.

After identifying the first set of search results, a determination may be made as to whether the identified data items associated with the search result are below a threshold (although this is not required). If the number of identified data items is below a threshold, the system may search for additional data items based on various relationships between search results.

Once additional data items are discovered, the aggregated search results (e.g., the initial search results and/or the data items discovered using the relationships described above) may be evaluated according to one or more properties, criterion or factors to determine a relevance score and/or a popularity score. Example criterion/factors include, but are not limited to, semantic similarity between terms in the identified information and terms associated with the data items in the data source; distance or number of data items (e.g., nodes) between a first data item and a second data item in the data source; relationship properties of the data items; other data item properties, and so on.

In some examples, the relevance score may be based, at least in part, on a relationship between one or more entities, topics, content items, and so on. The popularity score may be based on how recently a content item or data item was accessed, how often a content item or data item is accessed, a frequency with which a content item or data item is cited in or referenced by another content item or data item and so on. Once the data items are identified, a visualization associated with the search results may be generated and provided on a display of a computing device.

Accordingly, the present disclosure provides a plurality of technical benefits including but not limited to: improving the identification of shared knowledge, identifying data items linked to data, tracking and identifying implicitly linked data items, ranking content item importance, generating a visualization to help individuals visualize what others are working on and/or have worked on in the past, determining entity knowledge levels, identifying biographical information and talking points for new and/or existing user contacts, and enabling entity contextualization, among other examples.

FIG. 1 illustrates an overview of an example system 100 for identifying what individuals are working on according to an example. In some examples, the individuals may be part of a team, group, an organization, etc. In other examples, the individuals may be arranged in an ad hoc configuration and not related (or partially related) to an organization, team or group.

The various systems shown in FIG. 1 are presented as a combination of interdependent components that interact to form an integrated whole. Components of the system may be hardware components or software components implemented on and/or executed by hardware components of the system. In one example, system 100 may provide an operating environment for software components to execute and utilize resources or facilities of the system 100. In another example, the various systems disclosed herein may be distributed across multiple computing devices. For example, input may be entered on a client device and information may be processed or accessed from other devices in a network, such as one or more cloud or remote server devices.

As one example, system 100 may include a service environment 110. The service environment 110 may include one or more data sources 120, a relationship system 130, a visualization generation system 140, an access control system 150 and a query formulation system 155. The system 100 may also include a network 180 that enables data to be transmitted between a computing device 160 and the service environment 110.

The scale of the system 100 may vary and may include more or fewer systems than those described in FIG. 1. Examples of a computing device 160 include, but are not limited to, a personal computer (PC), a mobile device (e.g., smartphone/phone, tablet, laptop, personal digital assistant (PDA)), a wearable device (e.g., smart jewelry, a body-mounted device), or the like. In aspects, computing device 160 may comprise, or have access to, one or more software applications or services that detect and/or collect input from users using one or more sensor devices. Examples of software applications or services include, but are not limited to, presentation tools, word processing tools, spreadsheet tools, calendar/tasking tools, messaging and/or communication tools, content discovery/retrieval tools, personal digital assistant tools, and the like. The collected input may include, for example, voice input, touch input, text-based input, gesture input, and/or video/image input. Examples of sensor devices include microphones, touch-based sensors, keyboards, pointing/selection tools, optical/magnetic scanners, accelerometers, magnetometers, gyroscopes and the like.

The computing device 160 may provide the collected input to the service environment 110. Upon receiving the collected input, the service environment 110 may perform processing techniques to identify information (e.g., one or more terms, topics, entities, time/date information) in or relating to the collected input. Once that information is collected, the relationship system 130 may determine one or more relationships between the collected input with respect to previously collected input.

In other examples, the relationships may not be determined until a query for a particular data item (or data items) is received. When a query is received and relationships are determined, the determined relationships between the various data items may be stored. As described above, a data item may refer to one or more entities (e.g., individuals, groups, organizations, and the like), one or more content items (e.g., documents, presentations, electronic messages, audio/video recordings and the like), one or more domains, and the like.

In some examples, the collected input and/or the determined relationships may be updated in real-time or substantially real-time. For example, if metadata associated with a particular entity identifies a first individual, Cate Smith, as a supervisor of a particular group of individuals and metadata associated with a second individual, Luke Jones, identifies the second individual as someone that is part of the group and/or that reports to Cate Smith, the relationship system 130 may update and/or create a relationship between Luke Jones and Cate Smith. Additionally, the relationship may identify, update and/or create a relationship between Cate Smith and the various other data items (e.g., content items, entities, domains, topics) associated with Luke Jones.

The collected input may also be used to generate one or more search queries 170. The search queries 170 may be used to search data sources 120 for data items, relationship data, and/or property information relating to input that was previously collected. Examples of data sources 120 include, but are not limited to, databases, data tables, data files, and similar data structures storing data.

If the collected input indicates that an individual wants to execute a search for a particular individual (e.g., Cate Smith) or data items associated with Cate Smith, the individual may input (e.g., via voice or text) the name "Cate Smith" into a search box of a user interface provided on the computing device 160. The search query 170 of Cate Smith may be provided to the service environment 110. Once the search query 170 is received, the service environment 110 may execute a query using Cate Smith to determine a first set of one or more data items that are associated with Cate Smith.

Figure 5A:
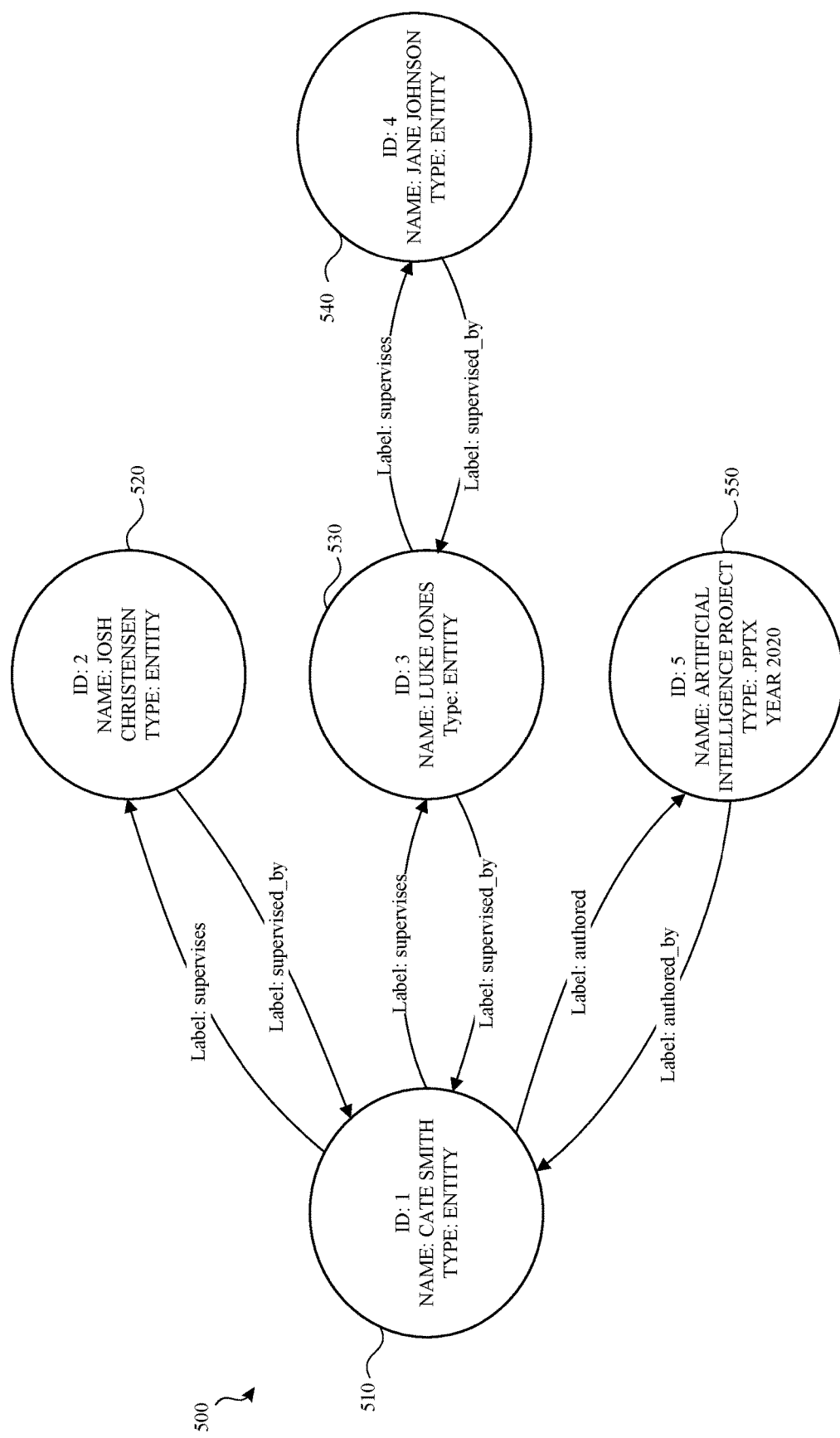
FIG. 5A is an example data structure that includes data items according to an example.

For example, and turning to FIG. 5A which illustrates an example structure 500 that may be used to identify various relationships between data items, node 510 represents the entity Cate Smith. Node 510 is connected to node 520, node 530 and node 550. Node 520 and node 530 are identified as entities that Cate Smith supervises while node 550 is identified as a content item (e.g., Artificial Intelligence Project presentation) that Cate Smith authored. Additionally, node 530 is connected to node 540. The relationship between these nodes indicates that the entity Jane Johnson is supervised by the entity Luke Jones.

Continuing with the example above, when a query using the term Cate Smith is executed, the content item "Artificial Intelligence Project" would be identified as a potential search result. However (and referring back to FIG. 1), the service environment 110 may determine that the number of search results is below a threshold. Since the number of search results is below the threshold, the service environment 110 and the relationship system 130 may determine or otherwise identify relationships between Cate Smith and other data items. As indicated above, the threshold determination is not required and the service environment 110 and the relationship system 130 may identify the relationships as part of a standard operating procedure. In other examples, received input (e.g., additional input received from an individual associated with the computing device) may be used to indicate whether relationships between the search term and other data items should be identified and additional search results returned.

Figure 5B:
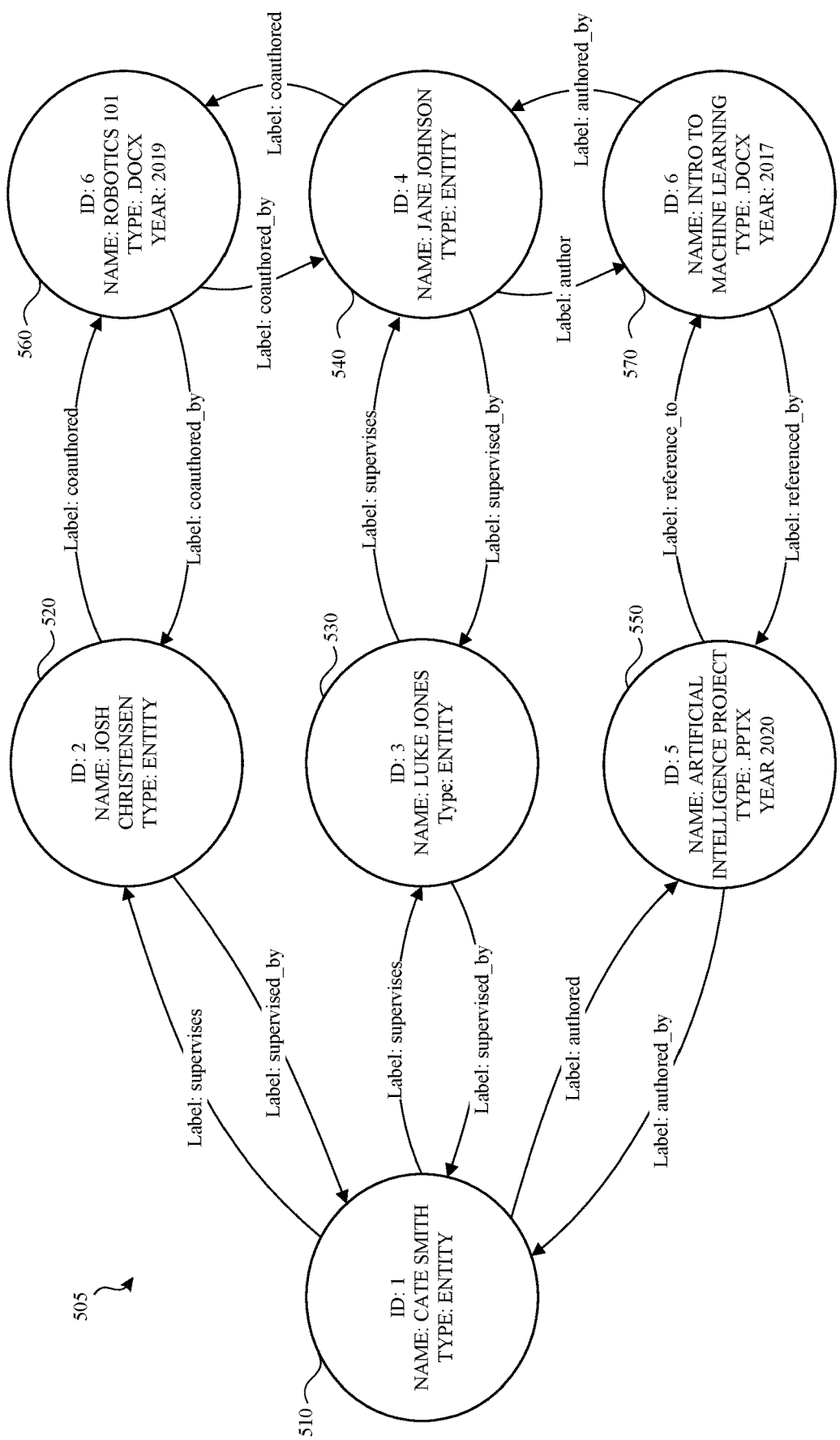
FIG. 5B is another example data structure that includes multiple data items according to an example.

The relationship system 130 may further identify relationships between the various nodes of one or more data sources. For example, and referring to FIG. 5B, the relationship system 130 may identify a relationship in the example structure 505 between node 520 and node 560, a relationship between node 550 and node 570, a relationship between node 540 and node 560 and a relationship between node 540 and node 570. As shown in FIG. 5B, node 560 and node 570 are content items. Further, some of the relationships between the nodes may be implicit relationships or explicit relationships with respect to the initial search term of Cate Smith. For example, the content item "Robotics 101" may have an implicit relationship with Cate Smith based, at least in part, on the explicit relationship between Cate Smith and Josh Christensen (node 520) and the explicit relationship between Josh Christensen and the Robotics 101 document (node 560).

In another example, the content item "Intro to Machine Learning" (represented by node 570) may have an implicit relationship with Cate Smith based on information that the "Artificial Intelligence Project" presentation (represented by node 550) references the "Intro to Machine Learning" document (represented by node 570). In yet another example, Jane Johnson (represented by node 540) may have an implicit (or explicit) relationship with Cate Smith based, at least in part, on one or more of 1) the relationship "supervises/supervised by" between nodes 530 and 540; 2) the relationship "coauthored/coauthored by" between node

520 and 560 and between node 540 and node 560; and/or 3) the relationship "reference to/referenced by" between node 550 and node 570 and the relationship "author/authored by" between node 540 and 570. Although specific examples are specifically mentioned, FIG. 5B shows that a number of relationships (both explicit and implicit) may be identified (e.g., the relationships "supervises/supervised_by").

Referring back to FIG. 1, in some examples, the relationship identification discussed above may occur automatically (e.g., regardless of whether the first set of one or more search results is below the threshold). In other examples, the relationship identification described above may be conducted in response to received input. For example, in response to a received search query 170 and subsequent identification of the first set of one or more content items, the service environment 110 may provide a notification to the computing device 160 that the search results identifying one or more data items is below a threshold. In such an example, an individual may provide input in the user interface of the computing device indicating the individual would like to be provided additional search results based on identified relationships between the term in the search query 170 and the data items stored in the data sources 120.

In response, the relationship system 130 may determine one or more relationships between the search term (e.g., Cate Smith) and one or more data items (such as explained above with reference to FIG. 5A and FIG. 5B).

In this example, the service environment 110, in conjunction with the relationship system 130, will perform a search on the data sources 120 for any data item in which Cate Smith has a relationship with the identified entities and in which the identified entities have authored, co-authored, commented on or are otherwise associated with various content items. In some examples, the relationship system 130 may analyze various metadata associated with various data items in the data sources 120 to identify the relationships set forth in the search query 170.

In another example, the collected input may be related to a particular subject matter (e.g., artificial intelligence) and/or a particular group of individuals. For example, a particular individual may generally know that Cate Smith's group is responsible for artificial intelligence projects. As such, the collected input may specify that the individual is interested in files from people reporting to Cate Smith about artificial intelligence. In another example, the collected input may be "Cate Smith AI".

Although a specific example has been given, a search query 170 can be generated for any specified time period, group of individuals, subject matter, domain, document, collaborator, entity, content item and so on. Additionally, a query can be generated for various properties (e.g., cited by, hyperlinked to, commented on, colleague of, copied to, copied from, received by, received from). In some examples, one or more filters may be associated with the search query 170 to enable the individual to perform a more granular search for content items. The filter may include a filter for a time period, keyword, collaborator, and so on.

In another example, collected input may be provided to the service environment 110 and the query formulation system 155 may be used to generate a suggested search query 175. The suggested search query 175 may be provided to the computing device 160.

The suggested search query 175 may be provided to the individual in order to narrow the search results to a particular group, individual, and/or subject matter. The suggested search query 175 may be based on the collected input and one or more identified relationships between terms in the collected input and various data items (and/or associated information about the data items) in the data sources 120.

In some examples, the relationship system 130 may determine that the individual that provided the collected input has a relationship with the various data items identified or otherwise associated with a term in the collected input. For example, the individual could be a member of a group that is associated with a term in the collected input. In another example, the individual could be identified as a subject matter expert (or otherwise associated with subject matter) for subject matter identified by a term in the collected input. In yet another example, the relationship system 130 may identify a relationship between an entity and/or a content item identified by or associated with a term in the collected input.

For example, the individual that provided the collected input may be identified as an individual that reports to Cate Smith and/or an individual that is part of a team or group for which Cate Smith is identified as the leader/supervisor. Thus, the suggested search query 175 may be a query for content items that are authored by, or are otherwise associated with, individuals that report to Cate Smith. In another example, the collected input may include a name of an individual that reports to Cate Smith or is associated with a group for which Cate Smith is identified as the supervisor/leader. As such, the suggested search query 175 may similarly be a query for content items that are authored by individuals that report to Cate Smith or are part of a particular organization or group. Although a query for content items is specifically mentioned, the suggested search query 175 may be a query for any data item stored by the data sources 120.

Continuing with the example above, the suggested search query 175 could be a search query for individuals that report to Cate Smith, a search query for individuals that are part of a particular group, a search query for individuals that are working on particular subject area, project(s), and/or documents, and/or a search query for data items that are part of a group for which Cate Smith is identified as the head.

The query formulation system 155, in combination with the relationship system 130, may determine that Cate Smith, a group of individuals that report to Cate Smith and/or a group for which Cate Smith is identified as the head, is responsible for content items relating to artificial intelligence. Accordingly, the query formulation system 155 may generate a suggested search query 175 for files from people that report to Cate Smith about artificial intelligence.

In some examples, the suggested search query 175 may be provided to the individual via a user interface on the computing device 160. In response to received input in which the individual indicates the suggested search query 175 should be executed, the service environment 110 executes the suggested search query 175 and the visualization generation system 140 generates a visualization 190 (described in more detail below). In other examples, the suggested search query 175 may be automatically executed (e.g., without receiving input from the individual).

In yet other examples, the collected input may specify an entity, a particular subject matter and/or a particular group. For example, the individual may provide input of "Cate Smith artificial intelligence". In another example, the individual may provide input of "Cate Smith's team". In response to the input, the service environment 110 would execute a search for data items associated with Cate Smith and artificial intelligence or entities that are part of Cate Smith's team such as described above. The collected input may also be in a form similar to that which would be generated by the query formulation system 155. For example, the individual may provide a search query 170 for "files about artificial intelligence for which Cate Smith is responsible", "files from people that report to Cate Smith about artificial intelligence" or "files that people on Cate Smith's team have contributed to" and various combinations.

Figure 5C:
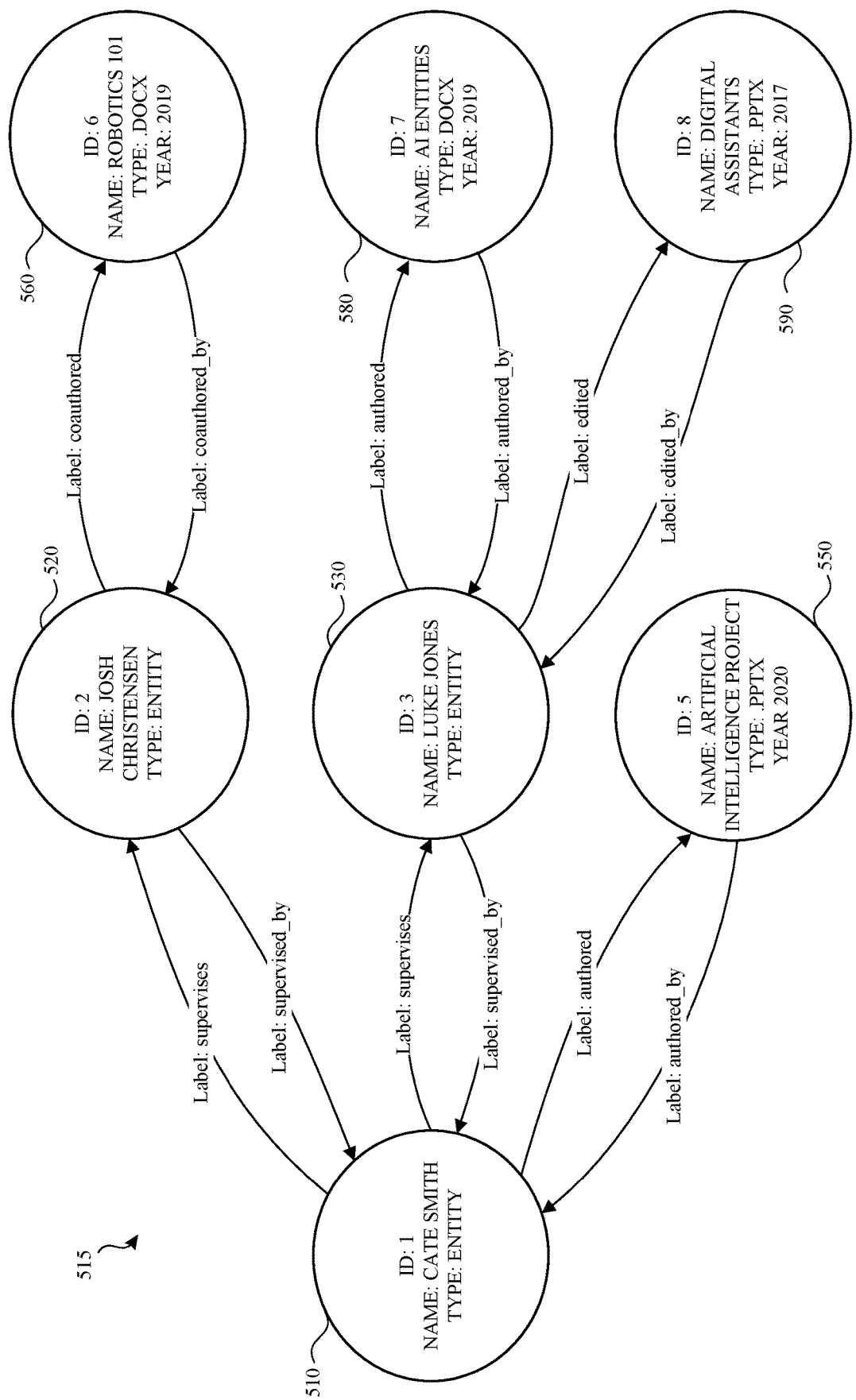
FIG. 5C illustrates another example data structure that includes multiple data items according to an example.

For example and referring to FIG. 5C, a query for "Cate Smith artificial intelligence" may return the following content items: 1) Robotics 101 (represented by node 560) based on the relationship "supervises/supervised_by" between nodes 510 and 520 and the relationship "coauthored/coauthored_by" between nodes 520 and 560; 2) AI Entities (represented by node 580) based on the relationship "supervises/supervised_by" between nodes 510 and 530 and the relationship "authored/authored_by" between nodes 530 and 580; 3) Digital Assistants (represented by node 590) based on the relationship "supervises/supervised_by" between nodes 510 and 530 and the relationship "edited/edited_by" between nodes 530 and 590; and 4) Artificial Intelligence Project (represented by node 550) based on the relationship "authored/authored by" between nodes 510 and 550.

Although specific examples are given and relate to content items and entities, relationships may be established between any number of data items that are stored by the various data sources. For example, a node in the example structure 515 may be associated with a particular meeting about artificial intelligence that Cate Smith and Luke Jones attended. As such, content items that are associated with the meeting, Cate Smith and/or Luke Jones could be explicitly or implicitly linked together and returned based on an executed search query.

Referring back to FIG. 1, in some examples, search results identified by the search query 170 and/or the suggested search query 175 may be evaluated according to one or more properties, criterion and/or factors to determine a popularity and/or relevance score of one or more content items, subject matter, additional entities and so on. These factors may include the number of times a content item has been accessed by various individuals (e.g., the author, collaborators, colleagues), a number of times the content item has been cited in other content items, a number of times the content item has been forwarded (e.g., via email or other electronic message), a number of times content from the content item has been copied into another content item, a number of times an entity has been invited to a meeting, a number of times an entity has been referenced by another data item, whether the content item is viewed as authoritative, an amount of time that is/was spent (either by various individuals or groups of individuals) viewing/reading/working on the content item and the like.

In some examples, the service environment 110 may determine that a relationship and/or data items are too remote (or are too far removed) and/or are too abstract from the initial search term to be included in the search results. For example and referring back to FIG. 5B, the service environment 110 may determine that the relationship between node 510 and node 540 is too remote (e.g., based on a distance between the nodes, based on a determined relationship between node 510 and node 530 and on a determined relationship between node 530 and node 540) to be relevant to a search associated with Cate Smith. As such, the entity Jane Johnson (represented by node 540), as well as content items associated with Jane Johnson, would not be returned or otherwise provided in the visualization.

In another example, analysis of a content item (e.g., by an evaluation system) may determine that the content of a particular content item is not relevant to the initial search term. For example, the artificial intelligence entity or system may determine that the content of the document Robotics 101 (represented by node 560) does not have a high enough relevance score with respect to the search term Cate Smith and/or other data items associated with Cate Smith to be included in the search results.

In some examples, once the data items, relationships, and/or the one or more criterion are determined and/or identified, a visualization 190 is generated and provided to the computing device 160. In some examples, the visualization 190 is generated by the visualization generation system 140. Example visualizations are shown in FIG. 2A, FIG. 2B and FIG. 2C.

Figure 2A:
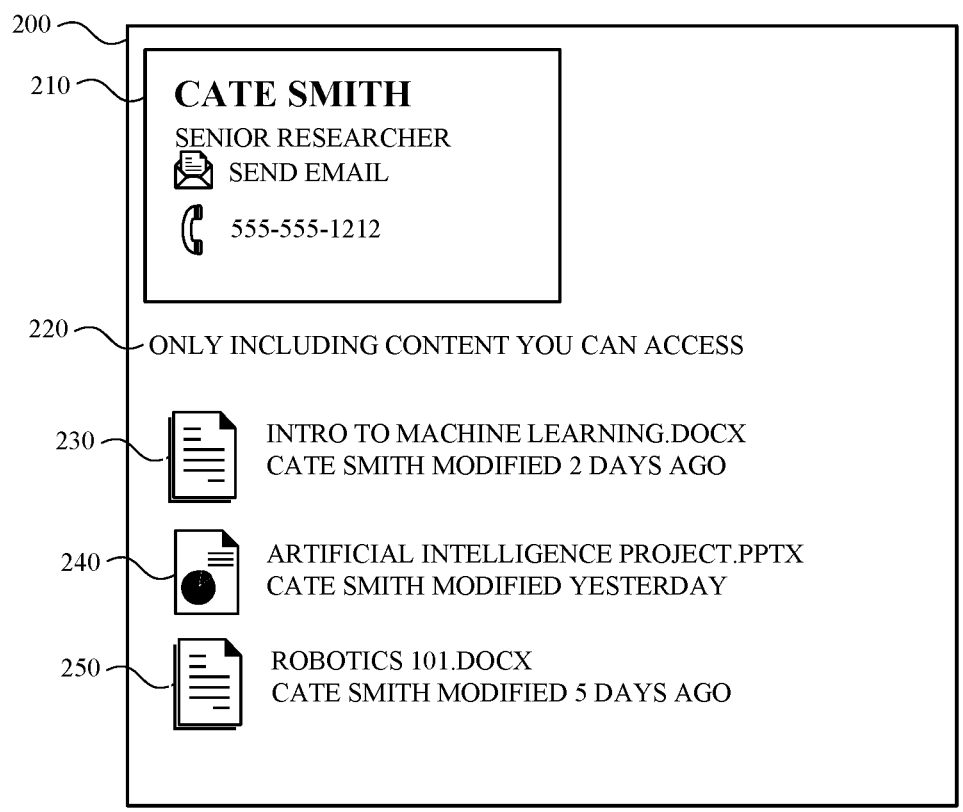
FIG. 2A illustrates an example visualization that may be provided to a computing device in response to a received search query according to an example.
Figure 2B:
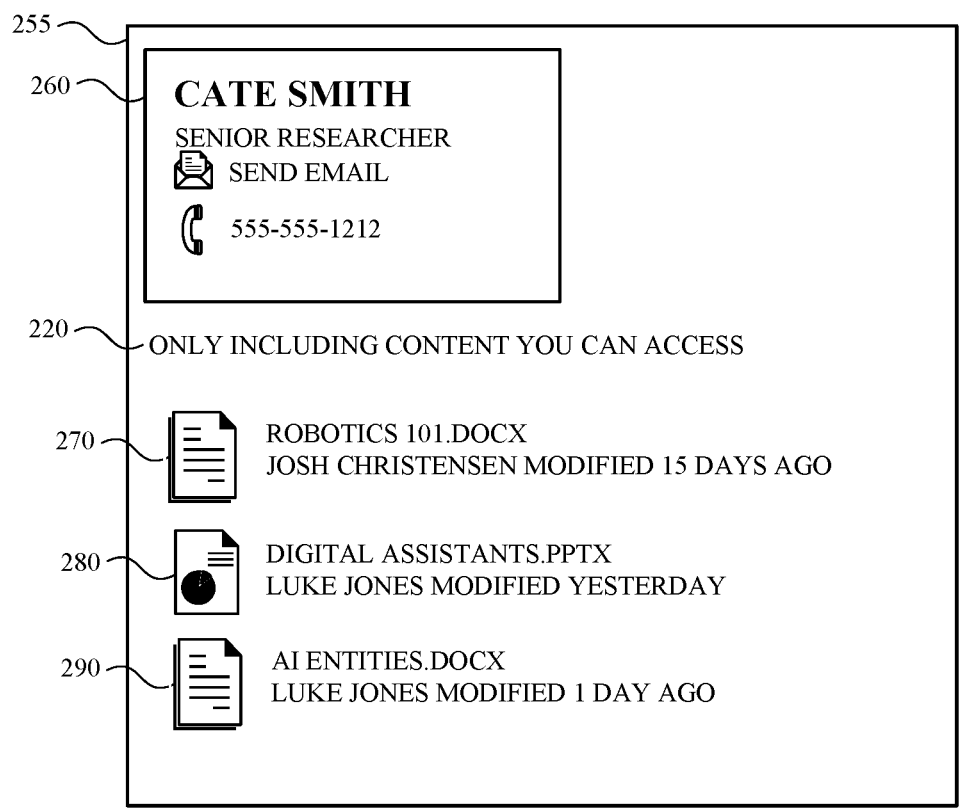
FIG. 2B illustrates another example visualization that may be provided to a computing device in response to a received search query according to an example.
Figure 2C:
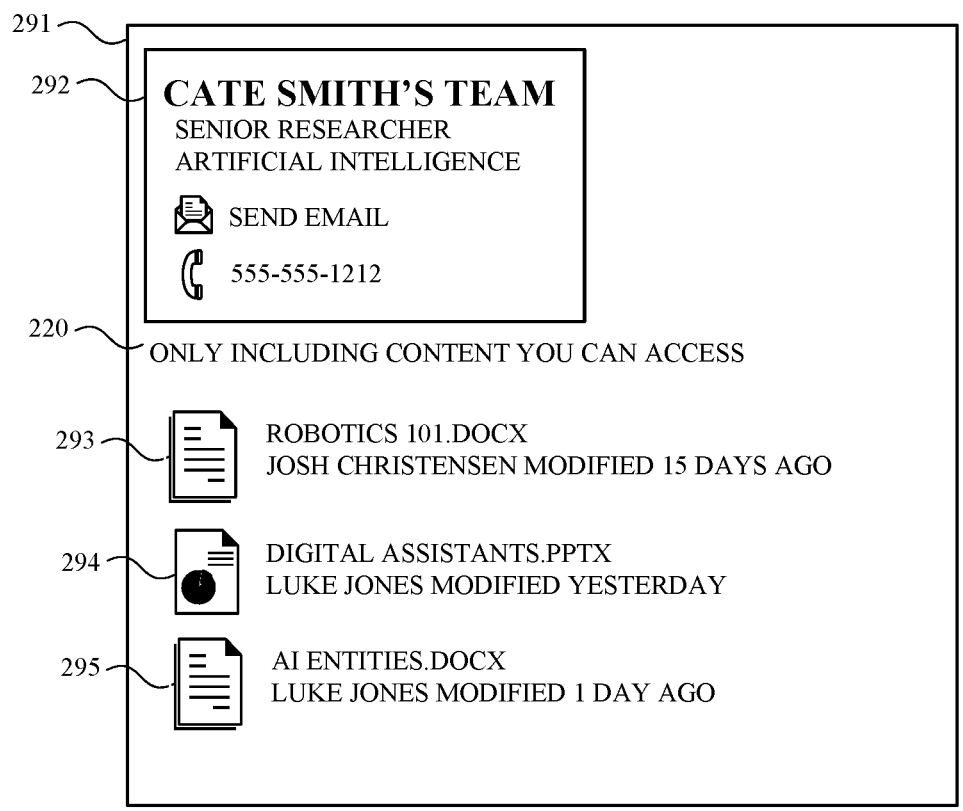
FIG. 2C illustrates another example visualization that may be provided to a computing device in response to a received search query for a group of individuals according to an example.

FIG. 2A illustrates an example visualization 200 that may be generated in response to a search query. In the example shown in FIG. 2A, the visualization 200 may be generated when a particular search term (e.g., an entity such as Cate Smith) would include results that are below a threshold.

As shown in FIG. 2A, the visualization may include a contact card 210 that includes the search term (e.g., Cate Smith in this example) as well as information about Cate Smith. The search results may limited to content items the requesting individual has access to (represented by message 220). The visualization 200 may also include various content items 230, 240, 250 that Cate Smith is associated with based on established or identified relationships such as discussed above. In some examples, the content items may be ordered by relevance and/or popularity.

The visualization 200 may include additional information. This information may include a subject matter associated with a search term, various collaborators and/or authors of the identified content items, a storage location for the content item, a brief summary of the content items and so on. In some examples, the authors and/or collaborators may be ordered by relevance and/or popularity.

In some examples, various content items, such as content item 230 and content item 250, may be removed from the visualization 200 (or not provided in the visualization 200) based on received input. For example, the individual that provided the collected input may indicate (e.g., using a selectable user interface feature, using text, using a voice command) that she wants to limit search results. For example, the individual may indicate via a user interface element that she is only interested in content items specifically authored by Cate Smith. As such, the visualization 200 would only include content item 240.

In some examples, selection of a particular content item provided in the visualization 200 may provide the individual access to the content item. For example, if an individual provides input to a computing device in which the "Intro to Machine Learning" document is selected, the individual is provided access to the document, provided that the individual has the proper access permissions.

As briefly indicated above, in some examples, access to various data items and other such information provided on the visualization 200 may be limited and/or removed from the visualization 200 based on various permission/access levels (represented by message 220) associated with the data item. For example, if metadata associated with a particular data item indicates that access rights for the data item are limited, the data item will not be provided on visualizations that are generated for individuals that do not have the required access rights. In another example, a content creator (e.g., author, co-author, collaborator) may restrict access to and/or remove content from being discoverable and/or otherwise provided on the visualization 200 including information provided in a contact card. Referring back to FIG. 1, the above-mentioned access control features may be provided by the access control system 150.

Although the above examples, are directed to a search query 170 in which a name of an individual is provided, the search query 170 may be related to any entity, content item, subject matter, domain and so on. Additionally, multiple queries may be executed to further narrow results. For example, instead of executing a search for "Cate Smith", the query that is received may be a natural language query for "return all documents from people that report to Cate Smith and that relate to artificial intelligence". In this example, the system 100 would filter search results based on individuals that are part of Cate Smith's organization (or report to Cate Smith) and who have authored content (or are otherwise associated with content) relating to artificial intelligence.

For example and referring to FIG. 2B, the visualization 255 may include a contact card 260 for Cate Smith, the message 220, and content items 270, 280, and 290 that relate to content items related to artificial intelligence for which individuals that report to Cate Smith (e.g., Luke Jones and Josh Christensen) have authored or are otherwise associated with.

FIG. 2C illustrates a visualization 291 that may be generated in response to a query for a group (e.g., Cate Smith's Team, AI Group), a group of individuals (e.g., people that report to Cate Smith) or a known/determined area of expertise (e.g., artificial intelligence) for a particular group or individual. Like the visualization 255, visualization 291 may include a contact card 292 for Cate Smith (who may be identified as the group leader and/or a subject matter expert for artificial intelligence), the message 220, and content items 293, 294, and 295 that relate to content items associated with team members (e.g., Luke Jones and Josh Christensen) that are part of the group for which Cate Smith is identified as the head and/or that report to Cate Smith.

Figure 3:
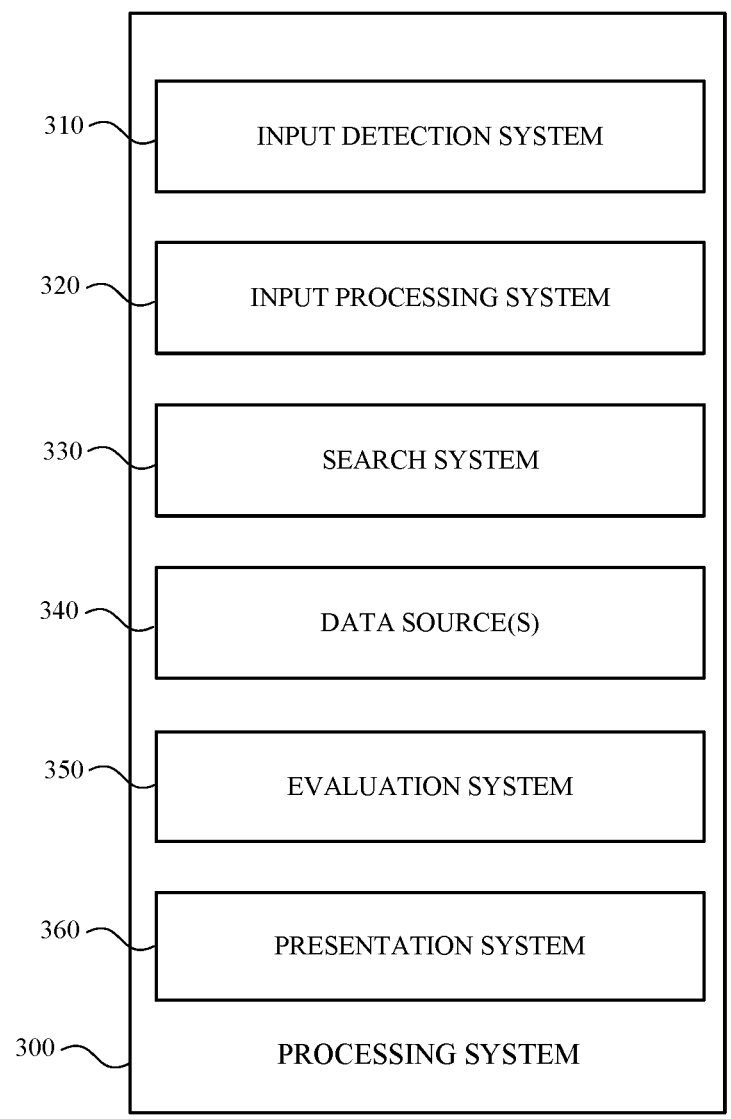
FIG. 3 illustrates an example input processing unit for identifying what an individual and/or a group of people are working on according to an example.

FIG. 3 illustrates an example processing system 300 for identifying what an individual and/or group is working on according to an example. In some examples, the processing system 300 may be used to identify a first set of data items, determine whether the first set of data items are above a threshold (optional), determine relationships between the first set of data items and a second set of data items, and to surface that information in the form of a visualization such as described herein.

The techniques implemented by processing system 300 may comprise the techniques and data described in system 100 of FIG. 1. In some examples, one or more components of processing system 300 (or the functionality thereof) may be distributed across multiple devices. In other examples, a single computing device (comprising at least a processor and/or memory) may comprise the various systems described with respect to the processing system 300.

In some examples, processing system 300 may comprise input detection system 310, input processing system 320, search system 330, data source(s) 340, evaluation system 350, and presentation system 360. One of skill in the art will appreciate that the scale of the processing system 300 may vary and may include additional or fewer systems than those described with respect to FIG. 3. For example, the functionality of the input processing system 320, the search system 330, and/or the evaluation system 350 may be combined into a single component, model, or algorithm.

The input detection system 310 may be configured to receive or detect input from one or more individuals or computing devices, such as computing device 160 (FIG. 1). The input may include audio data, touch data, text-based data, gesture data, video/image data, and the like. Detecting the input may include using one or more background processes to monitor and/or capture received input in real-time or substantially real-time.

Upon receiving the input, the input detection system 310 may perform one or more pre-processing steps. The pre-processing steps may include, for example, parsing the input into one or more input types (e.g., audio data, video data, text data), identifying user/device identifiers (e.g., user/account name, device name/type), identifying entry point information (e.g., application or service used to collect the input), identifying date/time information, identifying input attributes (e.g., length of input, subject and/or content of input), storing and/or labeling the input, etc. The input detection system 310 may provide the input and/or pre-processed data to the input processing system 320.

The input processing system 320 may be configured to perform one or more post-processing steps. The post-processing steps may include, for example, identifying one or more terms, entities, or topics in or relating to the input, identifying terms that are synonymous or similar to terms in the input, identifying one or more topics or categories associated with input, modifying the input to include additional or fewer terms, generating search queries and/or subqueries based on the input, identifying data sources comprising data associated with the input, etc. The input processing system 320 may provide the input and/or the post-processed data to the search system 330.

The search system 330 may be configured to search for data items using the input and/or the post-processed data and identify a first set of data items. In some examples, the search system 330 may use the input and/or the post-processed data identify one or more search results (e.g., topics, content items, entities, relationships, associated properties) in one or more data sources, such as data source(s) 340. Examples of data sources(s) 340 include user data (e.g., user account files, user profiles, personal information manager (PIM) files), application data (e.g., user contact files, email files, calendar files, chat session files, presentation files, word processing files, spreadsheet files), internal and external knowledge stores and the like.

Once the first set of data items are identified, the evaluation system 350 evaluates relationships or relationship pairs associated with the first set of data items to identify a second set of data items. The evaluation system 350 may be an artificial intelligence entity or an artificial intelligence system that analyzes various data items to identify relevance, popularity and/or relationships.

Identifying the first set of data items and/or the second set of data items may include traversing the content and structure of a data source and/or using a pattern matching technique. For example, the various nodes and edges of a data source, such as a graph database, may be traversed to identify data item tags and properties connecting or otherwise related to terms in the input. The search system 330 may provide all of the search results to the evaluation system 350.

The evaluation system 350 may be configured to evaluate search results identified using the search system 330. Evaluating the search results may include applying one or more criterion or assessing one or more factors. Example criterion/factors include semantic similarity between terms in the input and terms associated with the search results, distance between a first data item and a second data item in a visualization of a data source, number of data items or nodes between a first data item and a second data item in a visualization of a data source, relationship properties of the data items in a data source, properties for data items, etc.

In some examples, the evaluation system 350 may generate scores or ratings for one or more of the search results. Generating the scores or ratings may include assigning criterion/factor scores and or weighting factors to one or more of the various criterion/factors used to evaluate the search results. The various criterion/factor scores for each search result may be combined to form a search result score.

In at least one example, the search result scores may be sorted, ranked, and/or classified. The rankings or classification may indicate a popularity of one or more data items, a knowledge level of an individual or individuals that collaborated, created, commented on, and/or authored one or more content items, a relevance score of one or more content items, etc. The evaluation system 350 may provide the evaluated search results to the presentation system 360.

The presentation system 360 may be configured to generate and/or present a visualization associated with the search results. In some examples, the visualization may be similar to the visualization 200 shown and described with respect to FIG. 2A and/or the visualization 255 shown and described with respect to FIG. 2B. The presentation system 360 may present the indication of an identified knowledge level in the context of the input entry point.

Figure 4:
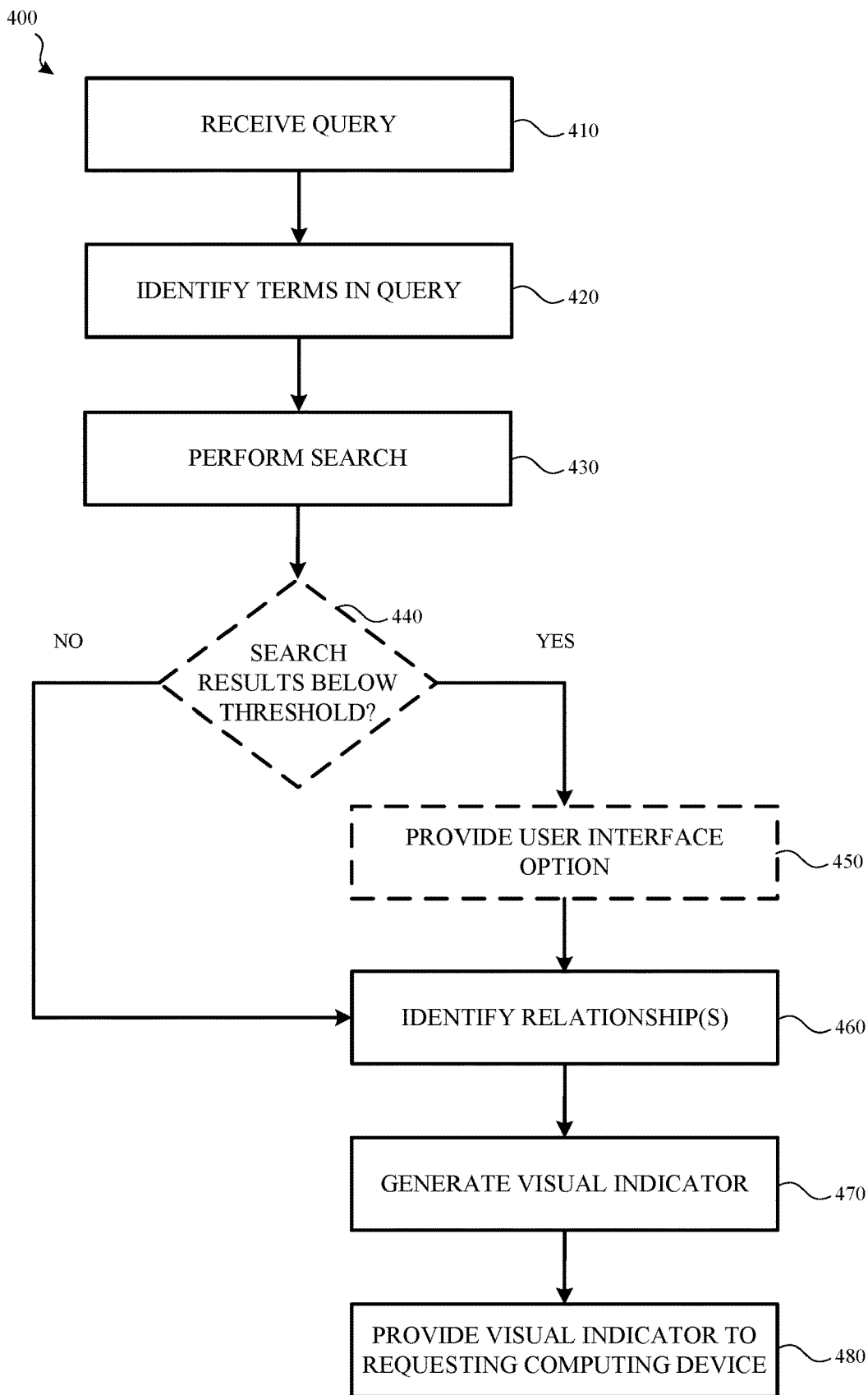
FIG. 4 illustrates an example method for generating a visualization that displays information about what individuals are working on according to an example.

FIG. 4 illustrates an example method 400 for generating a visualization that displays what various individuals are working on according to an example. Method 400 may be performed by the various systems described herein such as, for example, system 100 shown and described with respect to FIG. 1.

The method 400 may begin when a query is received (410). In some examples, the query is a natural language query. The query may include a single search term or multiple search terms that identify or are otherwise associated with a data item. For example, the query may specify an entity, an individual, multiple individuals, a group (e.g., Artificial Intelligence group, Cate Smith's Team), a group of individuals, any number of explicit individuals (whether in a group or not), a subject matter, a time period, a topic, a domain or domain-specific associations (e.g., mathematical subject classification, artificial intelligence subject classifications), a content item and so on. In some examples, the query is provided in a user interface of an application or other program executing on a computing device.

Once the query is received, the terms in the query are identified (420). In some examples, identification of terms in the query includes parsing the query to determine various content items of interest for the query and subsequently generating search terms that will be used to execute the query. In other examples, the query is parsed to identify relationships that should be considered when executing a generated query. For example, a query for N explicit individuals (e.g., Cate Smith, Luke Jones, Josh Christensen, Jane Johnson) may cause the system to generate and execute a query in the following form: query=(author:<person1-id> OR author:<person2-id> OR author:<person3-id> OR . . . OR author:<personN-id>). Although a specific example is given, additional queries may be generated based on different types of received input.

Identifying terms may also include identifying one or more additional terms and/or data items relating to the received input. This may include identifying terms that are synonymous or similar to terms in the received input, identifying one or more topics or categories associated with the received input, identifying a group and/or members of that group, modifying the received input (e.g., adding and/or removing terms), formulating suggested queries, generating subqueries based on the received input, identifying data sources comprising data associated with the received input, etc.

Once the terms of the query have been identified, a search (430) is performed using the generated query. The generated query may be used to search one or more data sources for data items. Searching the data source(s) may include using a search utility, such as a processing system 300 (FIG. 3), and regular expressions, fuzzy logic, a pattern recognition model/equation, or other search techniques. In some aspects, the search may be limited or otherwise restricted by various access control systems such as previously described.

Upon identifying a first set of data items (also referred to as search results), a determination (440) (optional) may be made as to whether a number of returned (or potential) search results is below a threshold. If the number or search results is below the threshold, a selectable option (450) (optional) to perform an additional search using identified relationships between the search term and additional data items may be provided on the user interface of the computing device.

In some examples, flow may proceed from operation (430) to operation (450) when a suggested search query (e.g., suggested search query 175 (FIG. 1)) is generated or otherwise provided. In such examples, a supplemental search may be executed based on the suggested search query to identify various search results such as previously described.

If the individual that submitted the query does not want to execute the additional search, a visualization, such as described above, may be generated (470). In other examples, method 400 may proceed from operation (430), or from operation (450) depending on received input, to operation (460) in which relationships between search results and other data items are identified. Identifying the search results may include traversing the content and structure of a data source. In some examples, the relationships are used to perform an additional search and/or otherwise identify a second set of one or more data items that are linked to or are otherwise associated with the first set of data items.

Once the relationships are identified and a second search is (optionally) performed, the system may generate (470) a visualization. The visualization that is generated may be similar to the visualization 200 shown and described with respect to FIG. 2A, FIG. 2B and/or FIG. 2C.

In some examples, the search results may be evaluated based on one or more properties, criterion or factors. Examples include semantic similarity between terms in the input and terms associated with the search results (e.g., exact matches may be prioritized over partial matches, acronyms may be prioritized over synonyms), distance between a first data item and a second data item in a visualization of a data source (e.g., close proximity nodes may be prioritized over nodes farther away), number of data items or nodes between a first data item and a second data item in a visualization of a data source (e.g., direct relationships between two nodes may be prioritized over node relationship comprising intervening nodes), relationship properties of the content items and/or entities in a data source (e.g., authoring a document is more indicative of knowledge than viewing a document, viewing a document is more indicative of knowledge than receiving a document), properties for content items (e.g., create/modify dates, authoritativeness, popularity, number of views, number of times referenced, viewer session metrics), properties for entities (e.g., area of expertise, experience, number of publications, awards, educational details, role/title, number of documents produced, number of documents co-authored, number and/or types of comments provided), publication dates, creation date, date of comments or other input, among others.

Once the visualization has been generated, the system provides (480) the visualization to the requesting computing device. In some examples, the granularity of the visualization may be changed and/or adjusted based on received input. In other aspects, a particular data item in the visualization may be selected. As such, the method 400 may be repeated and the search terms aggregated to show additional results. In yet another example, selection of a particular content item (e.g., a document) may cause the content item to be opened or otherwise accessible.

Figure 6:
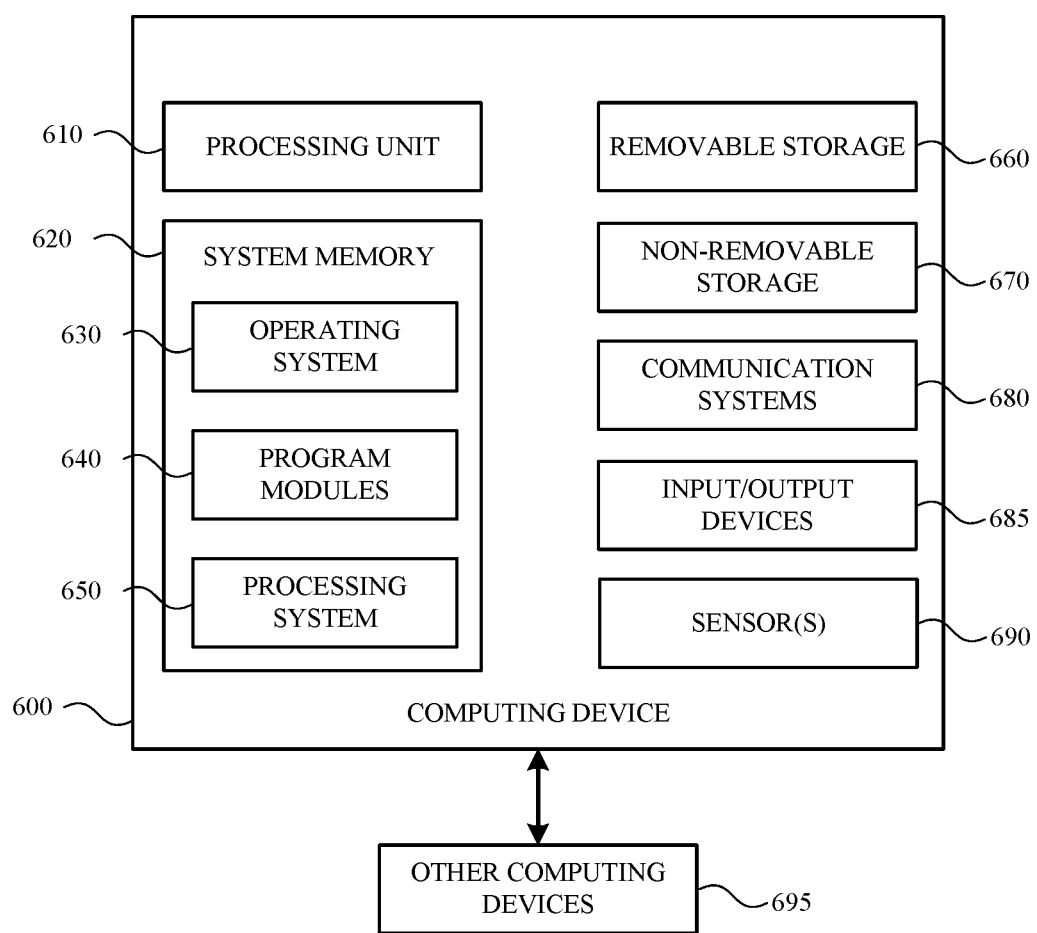
FIG. 6 is a system diagram illustrating example physical components of a computing device according to an example.

FIG. 6 is a system diagram of a computing device 600 according to an example. The computing device 600, or various components and systems of the computing device 600, may be integrated or associated with the various systems and/or subsystems described herein. As shown in FIG. 6, the physical components (e.g., hardware) of the computing device are illustrated and these physical components may be used to practice the various aspects of the present disclosure.

The computing device 600 may include at least one processing unit 610 and a system memory 620. The system memory 620 may include, but is not limited to, volatile storage (e.g., random access memory), non-volatile storage (e.g., read-only memory), flash memory, or any combination of such memories. The system memory 620 may also include an operating system 630 that controls the operation of the computing device 600 and one or more program modules 640. The program modules 640 may be responsible for receiving input, generating and/or determining relationships, generating visualizations and so on. Additionally or alternatively, the processing system 650 may be responsible for receiving input, generating and/or determining relationships, generating visualizations and so on. The memory 620 may also store and/or provide similar information and details. While executing on the processing unit 610, the program modules 640 may perform the various processes described above.

The computing device 600 may also have additional features or functionality. For example, the computing device 600 may include additional data storage devices (e.g., removable and/or non-removable storage devices) such as, for example, magnetic disks, optical disks, or tape. These additional storage devices are labeled as a removable storage 660 and a non-removable storage 670.

Examples of the disclosure may also be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 6 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 600 on the single integrated circuit (chip). The disclosure may also be practiced using other technologies capable of performing logical operations such as, for example, AND, OR, and NOT, including but not limited to mechanical, optical, fluidic, and quantum technologies.

The computing device 600 may include one or more communication systems 680 that enable the computing device 600 to communicate with other computing devices 695. Examples of communication systems 680 include, but are not limited to, wireless communications, wired communications, cellular communications, radio frequency (RF) transmitter, receiver, and/or transceiver circuitry, a Controller Area Network (CAN) bus, a universal serial bus (USB), parallel, serial ports, etc.

The computing device 600 may also have one or more input devices and/or one or more output devices shown as input/output devices 685. These input/output devices 685 may include a keyboard, a sound or voice input device, haptic devices, a touch, force and/or swipe input device, a display, speakers, etc. The aforementioned devices are examples and others may be used. The computing device 600 may also include various sensors 690 such as described herein.

The term computer-readable media as used herein may include computer storage media. Computer storage media may include volatile and nonvolatile, removable and non-removable media implemented in any method or technology for storage of information, such as computer readable instructions, data structures, or program modules.

The system memory 620, the removable storage 660, and the non-removable storage 670 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Examples of the present disclosure describe a system, comprising: a processor; and a memory communicatively coupled to the processor and storing instructions that, when executed by the processor, perform operations, comprising: detecting a query input in a user interface provided on a display of a computing device; processing the input to identify a term; determining whether a number of first content items to be returned in response to executing a query on a data source using the term is below a threshold; when it is determined the number of first content items to be returned is below the threshold: identifying a first relationship between the term and a plurality of data items stored in the data source; analyzing the plurality of data items to determine a second relationship between respective ones of the plurality of data items and a plurality of second content items; and providing, on the display of the computing device, a response to the query input, the response to the query input including at least a subset of the plurality of second content items. In some example, the memory also stores instructions, that when executed by processor, cause the system to analyze the plurality of second content items to determine a relevance score for each of the plurality of second content items. In some examples, the subset of the plurality of second content items is ordered based, at least in part, on a particular property. In some examples, the particular property is associated with a time period. In some examples, the particular property is associated with a number of times a particular content item in the plurality of second content items is accessed. In some examples, at least one of the plurality of data items is a content item. In some examples, at least one of the plurality of data items is an entity. In some examples, the term is a name of an individual within a group. In some examples, the first relationship is based, at least in part, on an identified hierarchical structure of the group. In some example, the memory also stores instructions, that when executed by processor, cause the system to provide, on the user interface, an option that enables the identification of the first relationship when it is determined the number of first content items to be returned is below the threshold.

Also describes is a method, comprising: detecting a query input in a user interface provided on a display of a computing device; processing the input to identify a term; determining whether a number of content items to be returned in response to executing a query on a data source using the term is below a threshold; when it is determined the number of content items to be returned is below the threshold: identifying a first relationship between the term and a first data item in the data source; analyzing the first data item in the data source to identify a second relationship between the first data item and a second data item; and providing, on the display of the computing device, a response to the query input, the response to the query input including the second data item. In some examples, the method also includes identifying a third data item in the data source based, at least in part, on a third relationship between a second data item and the third data item. In some examples, the method also includes analyzing the second data item and the third data item to determine a relevance score of the second data item and the third data item with respect to the term. In some examples, the method also includes providing, on the display of the computing device, the third data item in addition to the second data item. In some examples, the method includes arranging the second data item and the third data item based, at least in part, on the relevance score of the second data item and the third data item. In some examples, the method includes arranging the second data item and the third data item based, at least in part, on a first property associated with the second data item and a second property associated with the third data item. In some examples, the first data item is a content item. In some examples, the first relationship corresponds to at least one of: receiving the first data item; editing a content item associated with the first data item; collaborating on a content item associated with the first data item; or providing comments about a content item associated with the first data item.

The present application also describes a method, comprising: receiving input for a search query; processing the input to identify a term; identifying a first relationship between the term and a first data item in the data source; analyzing the first data item in the data source to identify a second relationship between the first data item and a second data item; and providing, on the display of the computing device, a response to the query input, the response to the query input including the second data item. In some examples, the method also includes identifying a third data item in the data source based, at least in part, on a third relationship between a second data item and the third data item.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system, comprising:
   a processor; and
   a memory communicatively coupled to the processor and storing instructions that, when executed by the processor, perform operations, comprising:
   detecting a query input in a user interface provided on a display of a computing device;
   processing the input to identify a term;
   determining a number of first documents to be returned in response to executing a query on a data source using the term is below a threshold;
   in response to determining the number of first documents is below the threshold, identifying, in the data source, a first relationship between the term and a plurality of data items stored in the data source;
   based on identifying the first relationship in the data source, analyzing the plurality of data items to determine a second relationship in the data source between the plurality of data items and second documents, wherein the second relationship is based on an interaction between the plurality of data items and the second documents; and
   providing, on the display of the computing device, a response to the query input, the response to the query input including the first documents and at least a subset of the second content items.

2. The system of claim 1, the operations further comprising analyzing the plurality of second documents to determine a relevance score for each of the plurality of second documents.

3. The system of claim 1, wherein the subset of the plurality of second documents is ordered based, at least in part, on a particular property.

4. The system of claim 3, wherein the particular property is associated with a time period.

5. The system of claim 1, wherein the particular property is associated with a number of times a particular document in the plurality of second documents is accessed.

6. The system of claim 1, wherein at least one of the plurality of data items is a content item.

7. The system of claim 1, wherein at least one of the plurality of data items is an entity.

8. The system of claim 1, wherein the term is a name of an individual within a group.

9. The system of claim 8, wherein the first relationship is based, at least in part, on an identified hierarchical structure of the group.

10. The system of claim 1, the operations further comprising providing, on the user interface, an option that enables the identification of the first relationship when it is determined the number of first documents to be returned is below the threshold.

11. A method, comprising:
    detecting a query input in a user interface provided on a display of a computing device;
    processing the input to identify a term;
    determining a number of first documents to be returned in response to executing a query on a data source using the term is below a threshold;
    in response to determining the number of first documents is below the threshold, identifying, in the data source, a first relationship between the term and a first data item in the data source;
    based on identifying the first relationship in the data source, analyzing the first data item in the data source to identify a second relationship in the data source between the first data item and a second data item, wherein the second relationship is based on an interaction between the first data item and the second data item; and
    providing, on the display of the computing device, a response to the query input, the response to the query input including the first documents and the second data item.

12. The method of claim 11, further comprising identifying a third data item in the data source based, at least in part, on a third relationship between the second data item and the third data item.

13. The method of claim 12, further comprising analyzing the second data item and the third data item to determine a relevance score of the second data item and the third data item with respect to the term.

14. The method of claim 13, further comprising providing, on the display of the computing device, the third data item in addition to the second data item.

15. The method of claim 14, further comprising arranging the second data item and the third data item based, at least in part, on the relevance score of the second data item and the third data item.

16. The method of claim 14, further comprising arranging the second data item and the third data item based, at least in part, on a first property associated with the second data item and a second property associated with the third data item.

17. The method of claim 11, wherein each of the first data item and the second data item is at least one of a user of a project.

18. The method of claim 11, wherein the first relationship corresponds to at least one of:
    receiving the first data item;
    editing a document associated with the first data item;
    collaborating on a document associated with the first data item; or
    providing comments about a document associated with the first data item.

19. A method, comprising:
    processing a received query to identify a term;
    identifying, in a data source, a first relationship between the term and a first data item in the data source, the first data item corresponding to a user or a project;
    based on identifying the first relationship in the data source, analyzing the first data item in the data source to identify a second relationship in the data source between the first data item and a first content item, wherein the second relationship is based on an interaction between the first data item and the first content item; and
    providing, for display on a computing device, a response to the received query, the response including the first content item.

20. The method of claim 19, further comprising identifying a second data item in the data source based, at least in part, on a third relationship between the first data item and the second data item.

* * * * *